United States Patent [19]
Ames

[11] Patent Number: 6,118,733
[45] Date of Patent: Sep. 12, 2000

[54] INTERLINK FOR SPATIALLY EXTENDED HYDROPHONES

[75] Inventor: Gregory H. Ames, South Kingstown, R.I.

[73] Assignee: The United States of America as represented by the Secretary of the Navy, Washington, D.C.

[21] Appl. No.: 09/412,196

[22] Filed: Oct. 4, 1999

[51] Int. Cl.[7] .................................................. H04R 1/44
[52] U.S. Cl. ........................................ 367/173; 367/154
[58] Field of Search .................................. 367/153, 154, 367/20, 173

[56] References Cited

U.S. PATENT DOCUMENTS 5,737,278  4/1998  Frederick et al. ...................... 367/149
5,748,565  5/1998  Cherbettchian et al. ............... 367/154

Primary Examiner—Ian J. Lobo
Attorney, Agent, or Firm—Michael J. McGowan; Kevin A. Oliver; Prithvi C. Lall

[57] ABSTRACT

An interlink for connecting hydrophone elements to allow a single sensing fiber to transition from a first hydrophone element, across the interlink, to a second hydrophone element. The interlink satisfies the dual objective of protecting the sensing fiber during handling system stresses, while desensitizing the sensing fiber along the interlink during operational periods. The interlink has a first end connected to the first hydrophone element, and a second end connected to the second hydrophone element. Between the interlink ends is at least one turn, and the distance traveled along the interlink turns is greater than the linear distance between the interlink ends. The interlink contains a groove that traverses the entire interlink length. Sensing fiber is wound off the first hydrophone element, into the interlink groove that follows the interlink turns, and onto the second hydrophone element. The turns allow the interlink to expand as desired, but the interlink design and material must be chosen to provide sufficient elasticity to return to original form. The sensing fiber may be epoxied to the interlink for greater connectivity.

10 Claims, 2 Drawing Sheets

INTERLINK FOR SPATIALLY EXTENDED HYDROPHONES

CROSS-REFERENCE TO RELATED APPLICATIONS

This patent application is co-pending with a related patent application entitled Semi-Rigid Low-Noise Interlink for Spatially Extended Hydrophones Ser. No. 09/412,198, now allowed, by the same inventor as this patent application, and a related application entitled Reduced Mechanical Coupling Interlink for Spatially Extended Hydrophones Ser. No. 09/412,197, now allowed, by the same inventor with two additional co-inventors.

STATEMENT OF GOVERNMENT INTEREST

The invention described herein may be manufactured and used by or for the Government of the United States of America for governmental purposes without the payment of any royalties thereon or therefore.

BACKGROUND OF THE INVENTION (1) Field of the Invention

The present invention relates generally to connecting hydrophone elements in linear arrays, and more particularly to a means for connecting elements to pass a sensing material, such as optical fiber, from one hydrophone element to another without adversely affecting the sensing material or measurement sensitivity.

(2) Description of the Prior Art

Hydrophone is a generic term describing a transducer that detects or monitors underwater sound. Hydrophones are typically pressure-actuated sensors and form the basis of sonar systems. Fiber-optic hydrophones employ fiber-optic cabling to sense pressure generated by acoustic wavefronts. Acoustic wavefront pressure produces measurable phase differences in the light waves guided by optical fiber.

A fiber-optic hydrophone typically includes a hollow, air-backed element known as a mandrel, with optical fiber wound on the mandrel surface. The advantages of multiple, smaller, interconnected mandrels when compared to a single larger mandrel, are presented in U.S. Pat. No. 5,317,544, and such advantages include increased sensitivity and system robustness during deployment. Although prior art discusses the need to connect multiple mandrel-wound hydrophones in series with a single fiber, the interlink's design and material is often ignored. U.S. Pat. No. 5,317,544 mentions a means for compliantly connecting adjacent hydrophone components, while U.S. Pat. No. 5,475,216 claims a neoprene spacer, and U.S. Pat. No. 5,155,548 describes a spacer preferably formed of neoprene. Neoprene spacers or interlinks induce undesirable phase noise in the sensing fiber.

There is currently not a hydrophone interlink that accomplishes the dual objectives of allowing the hydrophone array to bend as the array passes around small diameter handling sheaves during deployment, while also protecting the fiber between hydrophone elements during post-deployment so as to minimize phase noise along the interlink. What is needed is an interlink that is flexible during deployment, but during post-deployment (i.e., operation), ensures minimal fiber stretching due to array noise sources including acoustic noise, longitudinal stretching, pressure, and bending.

SUMMARY OF THE INVENTION

It is a general purpose and object of the present invention to provide a hydrophone interlink that connects two hydrophone elements while allowing a single sensing fiber to transition between the two hydrophones. It is a further object to provide such an interlink that is flexible during deployment to protect the sensing fiber as the interlink passes through small diameter handling sheaves. It is yet a further object that such an interlink, during the post-deployment phase, ensures minimal sensing fiber stretching along the interlink from hydrophone array noise sources, as such noise sources cause undesirable phase changes that interfere with the hydrophone element signals.

Other objects and advantages of the present invention will become more obvious hereinafter in the specification and drawings.

The objects are accomplished with the present invention through a hydrophone interlink with at least one turn that provides a fiber length between hydrophone elements that exceeds the linear distance between elements. The interlink material and shape allow temporary interlink stretching and compression during passes through handling sheaves, with memory to allow the interlink to return to its original shape. The interlink contains a groove that traverses the entire interlink length. The sensing fiber transitions from a first hydrophone element to immediately enter the interlink groove, whereupon the fiber follows the groove along the entire interlink length before transitioning to a second hydrophone element. The interlink groove minimizes induced phase and polarization changes measured by the sensing fiber along the interlink.

BRIEF DESCRIPTION OF THE DRAWINGS

A more complete understanding of the invention and many of the attendant advantages thereto will be readily appreciated as the same becomes better understood by reference to the following detailed description when considered in conjunction with the accompanying drawings, wherein like reference numerals refer to like parts, and wherein.

DESCRIPTION OF THE PREFERRED EMBODIMENT

Figure 1:
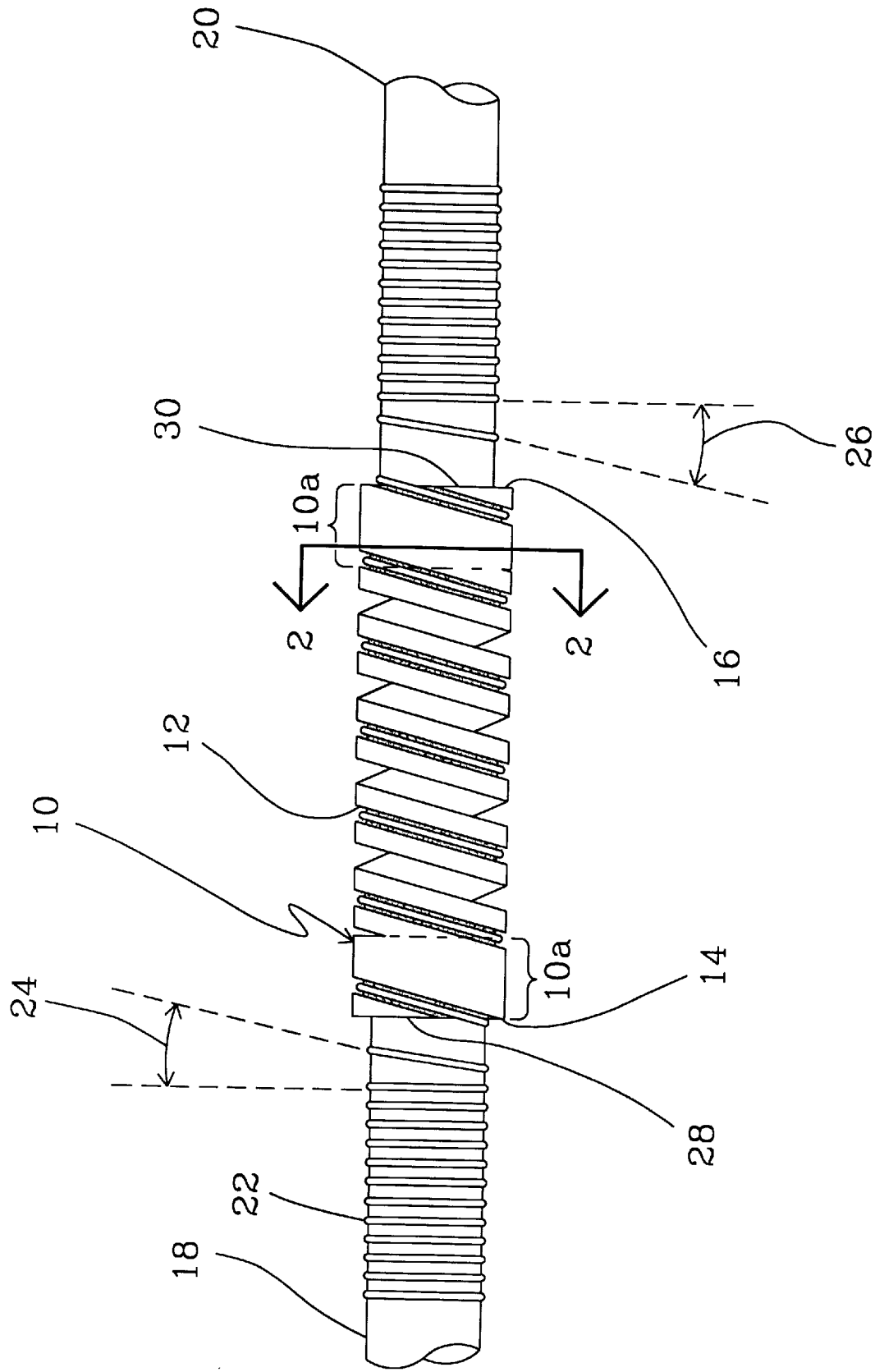
FIG. 1 shows an interlink connecting two hydrophone elements.

Referring now to FIG. 1, there is shown an interlink 10 with a helical spring design connecting hydroacoustic elements. FIG. 1 represents an interlink connecting optical fiber hydrophone elements known as mandrels. The helical interlink 10 provides flexibility for bending in handling systems without damaging the interlink or sensing fiber, with memory to return the interlink to the original shape after passing through the handling system. FIG. 1 also shows a groove 12 along the interlink with the same pitch as the interlink. The groove 12 traverses the entire interlink length, continuing to both interlink ends 14, 16 that connect respectively to first and second hydrophone elements 18, 20. At the interlink ends 14, 16, the groove 12 transitions optical fiber 22 between the hydrophone elements 18, 20 and the interlink 10.

FIG. 1 shows a first hydrophone element 18 with optical fiber 22 wound directly on the mandrel surface. With optical fiber 22 wound from left to right as shown, as the end of the first hydrophone element occurs, the optical fiber winding angle 24 changes to match the interlink structure and winding. The interlink for this application provides an optical fiber winding pitch that reduces the optical fiber length along the interlink. The winding from element to interlink must be configured such that the optical fiber 22 winds immediately into the interlink groove 12 at the interlink end attached to the first hydrophone element 18. The optical fiber 22 winding continues along the entire length of the interlink 10, using the groove 12 as a guide. The groove 12 transitions the fiber from the interlink 10 to the second hydrophone element 20. The optical fiber winding angle 26 is again adjusted to achieve the desired fiber winding for the second hydrophone element 20.

It is desirable to design groove 12 width and depth to fully accept and guide the sensing fiber. Epoxy or other bonding material may then be applied to the sensing fiber along the interlink groove to integrally connect the fiber and the interlink. In the example of acoustics, by connecting the fiber to an interlink composed of material insensitive to the acoustic wavefront, phase distortion effects along the interlink section of the sensing fiber are reduced.

For optical fiber acoustic applications, the interlink 10 can be constructed of a relatively non-compliant material such as polycarbonate. The interlink material selection is application dependent and is selected to provide stability to protect the sensing fiber, flexibility to expand or contract when required, and imperviousness to undesired effects (e.g., response to acoustic pressure). In fiber-optic applications, material flexibility to respond to the handling system forces is desirable, but material response to acoustic waveform pressure along the interlink is undesirable; therefore, polycarbonate is a suitable material for acoustic fiber-optic applications. If the optical fiber is epoxied into a groove 12 of an interlink material such as polycarbonate, such that the groove size matches the optical fiber size to prevent optical fiber movement along the interlink, the desired effect of diminishing the optical fiber's acoustic sensitivity along the interlink is achieved. The optical fiber's relative immobility throughout the interlink minimizes induced phase and polarization changes caused by fiber bending, stretching, and twisting.

The connections 28, 30 between the interlink and the hydrophone elements 18, 20 may be achieved in many ways depending upon the interlink material and design. Epoxy or another bonding agent may be used to attach the interlink to the hydrophone elements. One embodiment includes an interlink with a hollow interior at the interlink ends and an internal circumference slightly larger than the outer hydrophone mandrel circumference. The hydrophone element ends may then be inserted into the hollow interlink ends and secured with epoxy or other bonding agent or process. Alternately, screws may be used to affix the interlink to the elements.

Figure 2:
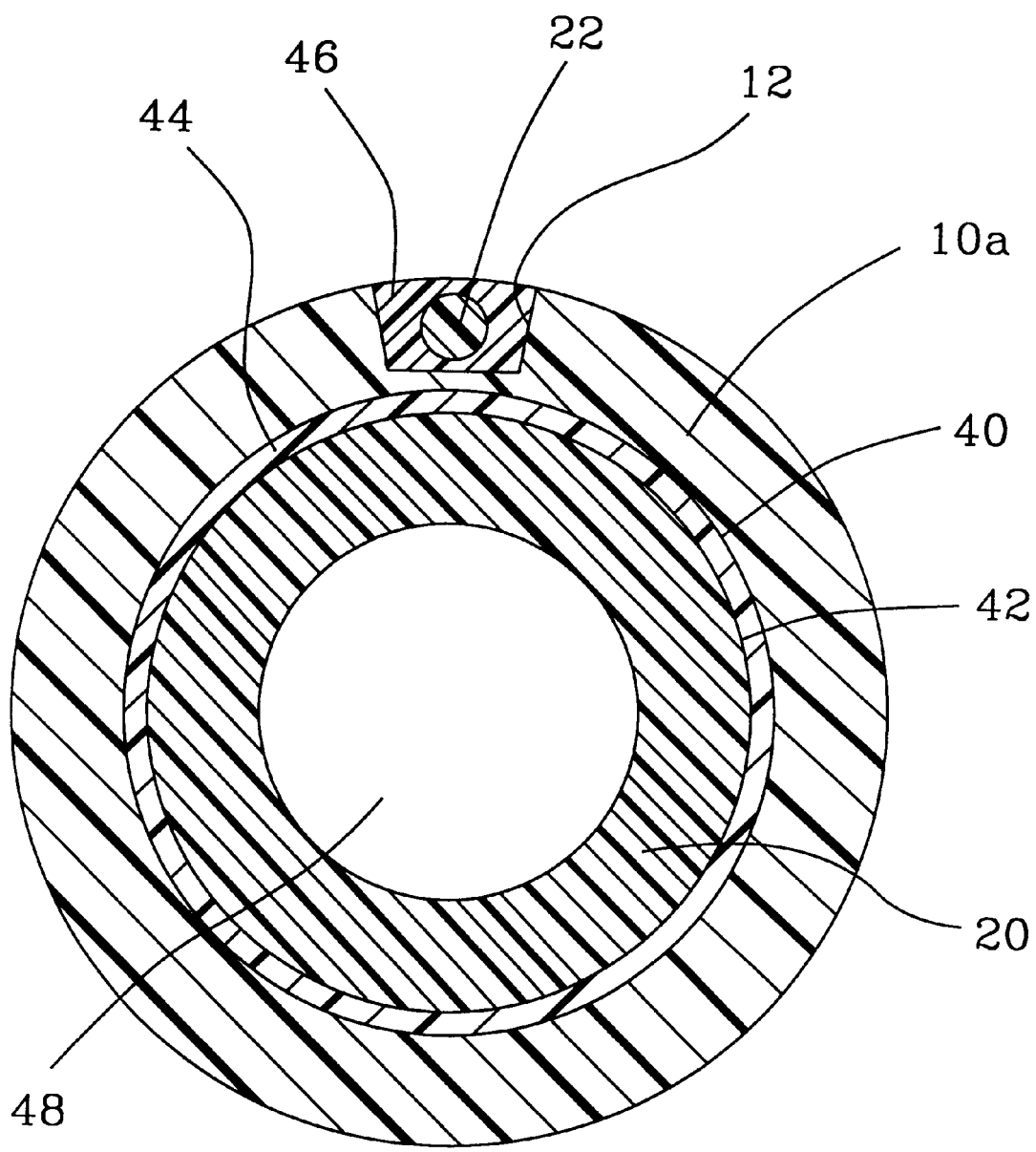
FIG. 2 shows the interlink's cross-sectional view taken along section 2—2 of FIG. 1.

Referring now to FIG. 2, there is shown a cross-sectional view of the interlink taken along section 2—2 of FIG. 1. The interlink connecting end 10a includes a hollow core with an inner-circumference 40 greater than the hydrophone mandrel outer-circumference 42. Epoxy 44 affixes the hydrophone mandrel outer surface 42 to the interlink interior surface 40. Similarly, epoxy 46 integrally embeds the optical fiber 22 within the interlink groove 12. The hydrophone mandrel 20 and the interlink 10 are hollow, although the hydrophone mandrel contains a plug 48 at the ends to prevent water from entering the mandrel.

The interlink of FIG. 1 and FIG. 2 is compatible with continuous fiber winding and assembly as the optical fiber is wound directly from mandrel, to interlink, to mandrel, with only a change in winding angle. The interlink's 10 single piece construction additionally simplifies automated assembly and reduces material costs. The FIG. 1 and FIG. 2 interlink 10 is hollow, and allows opportunities for other uses of the interlink's center region. The helical interlink also provides offsetting stretching and compression effects while the interlink bends.

The advantages of the present invention over the prior art are that: The present invention provides an interlink that protects the sensing fiber during hydrophone operational periods from increased, induced phase and polarization changes from fiber bending, stretching, and twisting; however, the interlink allows sufficient flexibility during deployment for bending in handling systems without damaging the sensing fiber.

What has thus been described is an interlink for connecting hydrophone elements to allow a single sensing fiber to transition from a first hydrophone element, across the interlink, to a second hydrophone element, while protecting the sensing fiber during handling system stresses and desensitizing the sensing fiber along the interlink during post-deployment. The interlink has a first end connected to the first hydrophone element, and a second end connected to the second hydrophone element. Between the interlink ends is a helical spring of at least one turn, and the distance traveled along the interlink turns is greater than the linear distance between the interlink ends. Sensing fiber transitions from a first hydrophone element, into a groove embedded throughout the interlink length that guides the fiber along the interlink turns, and onto the second hydrophone element. The turns allow the interlink to expand as desired, but the interlink design and material must provide sufficient elasticity to return to original form. The sensing fiber may be epoxied to the interlink for greater connectivity. The interlink groove and material selection combination minimize induced phase and polarization changes during hydrophone operational periods.

Obviously many modifications and variations of the present invention may become apparent in light of the above teachings. For example: Interlinks may have many designs, and although a helical spring was shown, various shapes may be used. There are many spring types and springs of the same type can have different spring constants or stiffness. The interlink shown has a round cross-section, while different shaped cross-sections may be used. The core of the interlink connecting ends may be hollow or solid. The sensing fiber may be wound with various tension to the interlink. The interlink may have any number of turns, depending upon the application and desire for flexibility. Although the preferred embodiment indicated a change in winding angle in the transitions between mandrels and interlinks, the winding angle change is not required and the interlink may be designed with the same winding pitch as the mandrel. The sensing fiber may not be affixed to the interlink. The interlink may not have a groove to guide the sensing fiber. The interlink may be connected to the hydrophone elements in a variety of manners. Adhesive agents and solvents other than epoxy may be used to connect the interlink to the hydrophone elements. Although the application shown included fiber-optic hydrophones, the same interlink may be used to connect hydrophone elements other than fiber-optic elements, where flexibility, elasticity, and the other interlink characteristics are desired. Multiple interlinks can connect multiple hydrophones in series.

In light of the above, it is therefore understood that within the scope of appended claims, the invention may be practiced otherwise than as specifically described.

What is claimed is:

1. An interlink for connecting a first hydrophone element and a distinct second hydrophone element, comprising:

a first interlink end for connecting to said first hydrophone element;

a second interlink end for connecting to said second hydrophone element;

means to affix said first and second interlink ends to said corresponding first and second hydrophone elements; and a helical spring element between the first and second interlink ends of at least one turn between said first interlink end and said second interlink end, such that the distance traveled along said at least one turn between said first and second interlink ends is greater than the linear distance between said first and second interlink ends.

2. The interlink of claim 1 further comprising a depression etched along the interlink surface to form a groove that begins at said first interlink end, follows the interlink along said at least one turn, and continues to said second interlink end.

3. The interlink of claim 2 wherein said groove has size to guide a sensing fiber along said at least one turn.

4. The interlink of claim 3 further comprising a means for affixing said sensing fiber to said groove.

5. The interlink of claim 4 wherein said means for affixing said sensing fiber to said groove further comprises epoxy.

6. The interlink of claim 1 wherein the interlink is formed of polycarbonate.

7. The interlink of claim 1 wherein said means to affix said interlink ends to said hydrophone elements comprises epoxy.

8. The interlink of claim 1 wherein the interlink provides a surface to guide a sensing fiber from said first hydrophone element to said second hydrophone element.

9. The interlink of claim 8 further comprising a means to affix said sensing fiber to said interlink surface.

10. The interlink of claim 9 wherein said means to affix said sensing fiber to said interlink surface further comprises epoxy.

* * * * *